US011718717B2

(12) United States Patent
Noda et al.

(10) Patent No.: US 11,718,717 B2
(45) Date of Patent: Aug. 8, 2023

(54) RESIN COMPOSITION, METHOD FOR PRODUCING RESIN COMPOSITION, FILM FORMATION METHOD, AND CURED PRODUCT

(71) Applicant: TOKYO OHKA KOGYO CO., LTD., Kawasaki (JP)

(72) Inventors: Kunihiro Noda, Kawasaki (JP); Hiroki Chisaka, Kawasaki (JP); Kazuya Someya, Kawasaki (JP); Dai Shiota, Kawasaki (JP)

(73) Assignee: Tokyo Ohka Kogyo Co., Ltd., Kawasaki (JP)

( * ) Notice: Subject to any disclaimer, the term of this patent is extended or adjusted under 35 U.S.C. 154(b) by 23 days.

(21) Appl. No.: 17/005,117

(22) Filed: Aug. 27, 2020

(65) Prior Publication Data

US 2020/0392292 A1 Dec. 17, 2020

Related U.S. Application Data

(63) Continuation of application No. 15/855,291, filed on Dec. 27, 2017, now Pat. No. 10,767,017.

(30) Foreign Application Priority Data

Dec. 28, 2016 (JP) .............................. JP2016-257012

(51) Int. Cl.
| | | |
|---|---|---|
| C08G 77/42 | (2006.01) | |
| C08G 77/18 | (2006.01) | |
| C09D 183/06 | (2006.01) | |
| C08G 77/08 | (2006.01) | |
| C08L 83/10 | (2006.01) | |
| C08L 83/16 | (2006.01) | |
| C08L 83/14 | (2006.01) | |
| C08G 77/60 | (2006.01) | |
| C07F 7/21 | (2006.01) | |
| C09D 183/04 | (2006.01) | |
| C09D 183/10 | (2006.01) | |
| C08G 77/04 | (2006.01) | |
| C08G 77/06 | (2006.01) | |

(52) U.S. Cl.
CPC ............ *C08G 77/18* (2013.01); *C08G 77/08* (2013.01); *C08G 77/42* (2013.01); *C08G 77/60* (2013.01); *C08L 83/10* (2013.01); *C08L 83/14* (2013.01); *C08L 83/16* (2013.01); *C09D 183/06* (2013.01); *C07F 7/21* (2013.01); *C08G 77/04* (2013.01); *C08G 77/06* (2013.01); *C09D 183/04* (2013.01); *C09D 183/10* (2013.01)

(58) Field of Classification Search
CPC .. C09D 183/06; C09D 183/04; C09D 183/10; C08G 77/42
See application file for complete search history.

(56) References Cited

U.S. PATENT DOCUMENTS

| 7,273,839 | B2* | 9/2007 | Koetzle | ................ | C11D 7/5022 |
| | | | | | 510/202 |
| 7,939,590 | B2 | 5/2011 | Iida et al. | | |
| 8,404,786 | B2* | 3/2013 | Akiyama | ............ | H01L 21/3122 |
| | | | | | 525/477 |
| 2007/0178319 | A1* | 8/2007 | Hamada | ............ | H01L 21/31695 |
| | | | | | 428/447 |
| 2007/0185262 | A1 | 8/2007 | Sakamoto | | |
| 2008/0114115 | A1 | 5/2008 | Iida et al. | | |
| 2009/0018247 | A1 | 1/2009 | Iida et al. | | |
| 2009/0251652 | A1 | 10/2009 | Kojima et al. | | |
| 2011/0117746 | A1 | 5/2011 | Maruyama et al. | | |
| 2013/0130179 | A1* | 5/2013 | Anno | ...................... | C08K 5/34 |
| | | | | | 430/286.1 |
| 2013/0287959 | A1 | 10/2013 | Bisaiji et al. | | |
| 2016/0096977 | A1 | 4/2016 | Tachibana et al. | | |

FOREIGN PATENT DOCUMENTS

| CN | 1950473 | A | 4/2007 |
| CN | 101551589 | A | 10/2009 |
| CN | 102084301 | A | 6/2011 |
| CN | 104245846 | A | 12/2014 |
| EP | 1650276 | A1 | 4/2006 |
| EP | 2256541 | A1 | 12/2010 |
| JP | H08-269399 | A | 10/1996 |
| JP | H09-031202 | A | 2/1997 |
| JP | 2005-072615 | A | 3/2005 |
| JP | 2006-291106 | A | 10/2006 |
| JP | 2007-182539 | A | 7/2007 |
| JP | 2007-211062 | A | 8/2007 |

(Continued)

OTHER PUBLICATIONS

Non-Final Office Action received in Japanese Patent Application No. 2020-078591, dated Feb. 24, 2021.
Office Action issued in Chinese Patent Application No. 201680035786.8, dated Sep. 21, 2020.
Supplementary European Search Report issued in European Patent Application No. 16821478.1, dated Jun. 11, 2018.
Office Action issued in European Patent Application No. 16821478.1, dated Jun. 25, 2018.
Office Action issued in Taiwanese Patent Application No. 105121813, dated Aug. 13, 2019.

(Continued)

*Primary Examiner* — Margaret G Moore
(74) *Attorney, Agent, or Firm* — Knobbe, Martens, Olson & Bear, LLP

(57) ABSTRACT

A resin composition including a silicon-containing resin component and a solvent, the silicon-containing resin component includes (I) mentioned below, the solvent including at least one of a terpene compound having at least one of a hydroxy group and an acetoxy group, and a cyclic skeleton-containing acetate compound (excluding the terpene compound):

(I) a polysilane-polysiloxane resin having a polysilane structure and a polysiloxane structure.

9 Claims, No Drawings

(56) References Cited

FOREIGN PATENT DOCUMENTS

| JP | 2007-286205 A | 11/2007 |
|----|---------------|---------|
| JP | 2008-120911 A | 5/2008 |
| JP | 2009-053273 A | 3/2009 |
| JP | 2009-211033 A | 9/2009 |
| JP | 2009-265602 A | 11/2009 |
| JP | 2015-108087 A | 6/2015 |
| JP | 2016-074772 A | 5/2016 |
| KR | 10-2011-0034024 | 4/2011 |
| TW | 201022862 A1 | 6/2010 |
| WO | WO 2010/010928 A1 | 1/2010 |
| WO | WO 2013/157643 A1 | 10/2013 |
| WO | WO 2015/118995 A1 | 8/2015 |

OTHER PUBLICATIONS

Office Action issued in U.S. Appl. No. 15/740,227, dated Aug. 22, 2019.
Final Office Action issued in U.S. Appl. No. 15/740,227, dated Dec. 5, 2019.
Office Action in U.S. Appl. No. 15/855,291 dated Mar. 15, 2019.
Final Office Action in U.S. Appl. No. 15/855,291 dated Sep. 30, 2019.
Office Action in U.S. Appl. No. 15/855,291 dated Jan. 16, 2020.
Office Action issued in related Chinese Patent Application No. 201680035786.8, dated Feb. 3, 2020.
Notice of Allowance in U.S. Appl. No. 15/855,291 dated May 1, 2020.
Extended European Search Report issued in the related European Patent Application No. 20152755.3, dated Aug. 7, 2020.

\* cited by examiner

RESIN COMPOSITION, METHOD FOR PRODUCING RESIN COMPOSITION, FILM FORMATION METHOD, AND CURED PRODUCT

RELATED APPLICATION

This application is a continuation of U.S. patent application Ser. No. 15/855,291, filed Dec. 27, 2017, which claims priority to Japanese Patent Application No. 2016-257012, filed Dec. 28, 2016, the entire content of which is incorporated herein by reference.

BACKGROUND OF THE INVENTION

Field of the Invention

The present invention relates to a resin composition, a method for producing the resin composition, a film formation method using the resin composition, and a cured product of the resin composition.

Related Art

Various substrates that require fine processing include, for example, substrates for display materials, such as a semiconductor substrate, a liquid crystal display, an organic light-emitting display (OLED), an electrophoretic display (electronic paper), a touch panel, a color filter, and a back light; substrates for solar cells; substrates for photoelectric conversion elements such as an optical sensor; and substrates for photoelectric devices. Fine processing is applied onto various substrates in the production process, and a protective film for protecting the substrates from fine processing is used. Such protective film is required to have in-plane uniformity with less in-plane thickness distribution from the viewpoint of productivity (yield) and flatness.

With miniaturization in the production process of a semiconductor substrate, when patterning is performed by a multilayer resist method, an upper layer resist is peeled off by a solvent and then a multilayer resist lower layer film is entirely removed by dry etching or a silicon-containing resist lower layer film is removed by wet etching using a stripping liquid containing hydrofluoric acid. Therefore, there is concern about damage to a processing substrate. Patent Document 1 has proposed, for example, a composition for forming a coating-type silicon-containing film, which is used to form a silicon-containing resist lower layer film capable of being easily wet etched with a stripping liquid that does not cause damage to a semiconductor substrate, a coating-type organic film required in a patterning step, and a CVD film containing carbon as a main component.

Patent Document 1: Japanese Unexamined Patent Application, Publication No. 2016-74772

SUMMARY OF THE INVENTION

However, the silicon-containing film formed using a coating-type composition mentioned in Patent Document 1 has large in-plane thickness distribution, thus requiring further improvement in in-plane uniformity. In light of the problems of the prior art, an object of the present invention is to provide a resin composition in which a film formed therefrom has excellent in-plane uniformity, a method for producing the resin composition, a film formation method using the resin composition, and a cured product of the resin composition.

The present inventors have found that inclusion of a specific solvent in a resin composition containing a silicon-containing resin component leads to an improvement in in-plane uniformity of a film to be formed, thus completing the present invention.

According to a first aspect of the present invention, there is provided:
a resin composition including a silicon-containing resin component and a solvent, wherein
the silicon-containing resin component comprises at least one selected from the group consisting of (I) and (II) mentioned below, and
the solvent comprises at least one solvent selected from the group consisting of a terpene compound having at least one group selected from the group consisting of a hydroxy group and an acetoxy group, and a cyclic skeleton-containing acetate compound (excluding the terpene compound):
(I) a polysilane-polysiloxane resin having a polysilane structure (I-1) and a polysiloxane structure (I-2), and
(II) a mixture of a resin having a polysilane structure (II-1) and a resin having a polysiloxane structure (II-2).

According to a second aspect of the present invention, there is provided a method for producing the composition according to the first aspect, the method including at least one selected from the group consisting of: performing a hydrolysis and condensation reaction of at least one silicon compound selected from the group consisting of silicon compounds represented by the general formulas (A-1-1) to (A-1-4) mentioned below, and at least one selected from the group consisting of a hydrolyzate, a condensate, and a hydrolyzed condensate of the silicon compound with a resin having a polysilane structure to obtain a polysilane-polysiloxane resin, and mixing a resin having a polysilane structure with a resin having a polysiloxane structure:

$$R^1R^2R^3SiX^1 \qquad (A\text{-}1\text{-}1)$$

$$R^4R^5SiX^2{}_2 \qquad (A\text{-}1\text{-}2)$$

$$R^6SiX^3{}_3 \qquad (A\text{-}1\text{-}3)$$

$$SiX^4{}_4 \qquad (A\text{-}1\text{-}4)$$

in the above general formulas, $X^1$ to $X^4$ are each independently a hydrolyzable group, $R^1$, $R^2$, $R^3$, $R^4$, $R^5$, and $R^6$ are each independently a hydrogen atom or an organic group, and hydrogen atoms in the organic group may be substituted with a halogen atom.

According to a third aspect of the present invention, there is provided a film formation method using the resin composition according to the first aspect. According to a fourth aspect of the present invention, there is provided a cured product of the resin composition according to the first aspect.

According to the present invention, it is possible to provide a resin composition in which a film formed therefrom has excellent in-plane uniformity, a method for producing the resin composition, a film formation method using the resin composition, and a cured product of the resin composition.

DETAILED DESCRIPTION OF THE INVENTION

Embodiment of the present invention will be described in detail below, but the present invention is not limited to the following embodiments and can be implemented by appropriately introducing variations within the object of the present invention. "To" as used herein means a range between the lower limit and the upper limit inclusive, unless otherwise specified.

<<Resin Composition>>

The resin composition according to the first aspect is a resin composition including a silicon-containing resin component and a specific solvent.

<Silicon-Containing Resin Component>

In the first aspect, the silicon-containing resin component comprises at least one selected from the group consisting of (I) and (II) mentioned below: (I) a polysilane-polysiloxane resin having a polysilane structure (I-1) and a polysiloxane structure (I-2), and (II) a mixture of a resin having a polysilane structure (II-1) and a resin having a polysiloxane structure (II-2). It is preferred that the polysiloxane structures (I-2) and (II-2) each independently comprise a hydrolyzed and condensed structure of at least one silicon compound selected from the group consisting of silicon compounds represented by the following general formulas (A-1-1) to (A-1-4):

in the above general formulas, $X^1$ to $X^4$ are each independently a hydrolyzable group, $R^1$, $R^2$, $R^3$, $R^4$, $R^5$, and $R^6$ are each independently a hydrogen atom or an organic group, and hydrogen atoms in the organic group may be substituted with a halogen atom. The hydrolyzable group represented by $X^1$ to $X^4$ includes an alkoxy group, a halogen atom, or an isocyanate group (NCO), and is preferably an alkoxy group. The alkoxy group includes alkoxy groups having 1 to 6 carbon atoms, and specific examples thereof include a methoxy group, an ethoxy group, an n-propoxy group, an i-propoxy group, an n-butoxy group, a t-butoxy group, a pentoxy group and the like. The halogen atom includes a fluorine atom, a chlorine atom, a bromine atom, or an iodine atom, and is preferably a chlorine atom.

The organic group represented by $R^1$ to $R^6$ includes organic groups having 1 to 30 carbon atoms, and examples thereof include alkyl groups [alkyl groups having 1 to 10 carbon atoms such as methyl, ethyl, n-propyl, i-propyl, n-butyl, and t-butyl groups (preferably alkyl groups having 1 to 6 carbon atoms, and particularly alkyl groups having 1 to 4 carbon atoms)], cycloalkyl groups (cycloalkyl groups having 5 to 8 carbon atoms such as a cyclohexyl group, and particularly cycloalkyl groups having 5 to 6 carbon atoms), alkenyl groups [alkenyl groups having 2 to 10 carbon atoms such as an ethenyl group, a propenyl group, and a butenyl group (preferably alkenyl groups having 2 to 6 carbon atoms, and particularly alkenyl groups having 2 to 4 carbon atoms)], cycloalkenyl groups [cycloalkenyl group having 5 to 10 carbon atoms such as a 1-cyclopentenyl group and a 1-cyclohexenyl group (preferably cycloalkenyl groups having 5 to 8 carbon atoms, and particularly cycloalkenyl groups having 5 to 7 carbon atoms)], aryl groups (aryl groups having 6 to 10 carbon atoms such as phenyl and naphthyl groups), aralkyl groups [$C_{6-10}$ aryl-$C_{1-6}$ alkyl groups such as benzyl and phenethyl groups ($C_{6-10}$ aryl-$C_{1-4}$ alkyl groups)], an amino group, an N-substituted amino group (N-mono- or di-substituted amino group substituted with the alkyl group, the cycloalkyl group, the aryl group, the aralkyl group, or the acyl group) and the like. The alkyl group, the cycloalkyl group, the aryl group, or the aryl group constituting the aralkyl group may have one or plural substituents. Examples of such substituent include the above-exemplified alkyl groups (particularly alkyl groups having 1 to 6 carbon atoms), the above-exemplified alkoxy groups and the like. Examples of the organic group having such substituent include $C_{1-6}$ alkyl-$C_{6-10}$ aryl groups such as tolyl, xylenyl, ethylphenyl, and methylnaphthyl groups (preferably mono-, di-, or tri-$C_{1-4}$ alkyl-$C_{6-10}$ aryl groups, and particularly mono- or di-$C_{1-4}$ alkylphenyl groups); $C_{1-10}$ alkoxy $C_{6-10}$ aryl groups such as methoxyphenyl, ethoxyphenyl, and methoxynaphthyl groups (preferably $C_{1-6}$ alkoxy $C_{6-10}$ aryl groups, and particularly $C_{1-4}$ alkoxyphenyl groups) and the like.

Examples of the silicon compounds represented by the general formulas (A-1-1) to (A-1-4) include trihalosilanes such as trichlorosilane, tribromosilane, and trifluorosilane; tetrahalosilanes such as tetrachlorosilane, tetrabromosilane, and tetrafluorosilane; alkyltrihalosilanes such as methyltrichlorosilane, methyltribromosilane, methyltrifluorosilane, ethyltrichlorosilane, ethyltribromosilane, ethyltrifluorosilane, n-propyltrichlorosilane, n-propyltribromosilane, n-propyltrifluorosilane, isopropyltrichlorosilane, isopropyltribromosilane, isopropyltrifluorosilane, n-butyltrichlorosilane, n-butyltribromosilane, n-butyltrifluorosilane, isobutyltrichlorosilane, isobutyltribromosilane, isobutyltrifluorosilane, sec-butyltrichlorosilane, sec-butyltribromosilane, sec-butyltrifluorosilane, tert-butyltrichlorosilane, tert-butyltribromosilane, and tert-butyltrifluorosilane; phenyltrihalosilanes such as phenyltrichlorosilane, phenyltribromosilane, and phenyltrifluorosilane; dialkyldihalosilanes such as dichlorodimethylsilane, dibromodimethylsilane, difluorodimethylsilane, dichlorodiethylsilane, dibromodiethylsilane, difluorodiethylsilane, dichlorodi-n-propylsilane, dibromodi-n-propylsilane, difluorodi-n-propylsilane, dichlorodiisopropylsilane, dibromodiisopropylsilane, difluorodiisopropylsilane, dichlorodi-n-butylsilane, dibromodi-n-butylsilane, difluorodi-n-butylsilane, dichlorodi-n-butylsilane, dibromodi-n-butylsilane, difluorodi-n-butylsilane, dichlorodiisobutylsilane, dibromodiisobutylsilane, difluorodiisobutylsilane, dichlorodi-sec-butylsilane, dibromodi-sec-butylsilane, difluorodi-sec-butylsilane, dichlorodi-tert-butylsilane, dichlorodi-tert-butylsilane, and dichlorodi-tert-butylsilane; diphenyldihalosilanes such as dichlorodiphenylsilane, dibromodiphenylsilane, and difluorodiphenylsilane; tetramethoxysilane, tetraethoxysilane, methyltrimethoxysilane, methyltriethoxysilane, ethyltrimethoxysilane, ethyltriethoxysilane, vinyltrimethoxysilane, vinyltriethoxysilane, propyltrimethoxysilane, propyltriethoxysilane, isopropyltrimethoxysilane, isopropyltriethoxysilane, butyltrimethoxysilane, butyltriethoxysilane, isobutyltrimethoxysilane, isobutyltriethoxysilane, allyltrimethoxysilane, allyltriethoxysilane, cyclopentyltrimethoxysilane, cyclopentyltriethoxysilane, cyclohexyltrimethoxysilane, cyclohexyltriethoxysilane, cyclohexenyltrimethoxysilane, cyclohexenyltriethoxysilane, phenyltrimethoxysilane, phenyltriethoxysilane, benzyltrimethoxysilane, benzyltriethoxysilane, tolyltrimethoxysilane, tolyltriethoxysilane, anisyltrimethoxysilane, anisyltriethoxysilane, phenethyltrimethoxysilane, phenethyltriethoxysilane, dimethyldimethoxysilane, dimethyldiethoxysilane, diethyldimethoxysilane, diethyldiethoxysilane, methylethyldimethoxysilane, methylethyldiethoxysilane, dipropyldimethoxysilane, dibutyldimethoxysilane, methylphenyldimethoxysilane, methylphenyldiethoxysilane, trimethylmethoxysilane, dimethylethylmethoxysilane, dimethylphenylmethoxysilane, dimethylbenzylmethoxysilane, dimethylphenethylmethoxysilane, tetraisocyanatesilane, methyltriisocyanatesilane, ethyltriisocyanatesilane, propyltriisocyanatesilane, butyltriisocyanatesilane, dimethyldiisocyanate, diethyldiisocyanate, dipropyldiisocyanate, dibutyldiisocyanate, trimethylisocyanatesilane, triethylisocyanatesilane, tripropylisocyanatesilane, tributylisocyanatesilane and the like.

The silicon compound represented by the above general formula (A-1-3) may be a silicon compound represented by the following formula (A-3).

$$HOOC-U-Z-Y-Si(OR^a)_3 \quad (A-3)$$

in the general formula (A-3), U represents a divalent group or a branched chain formed by eliminating each one of hydrogen atoms of two ring carbon atoms from an aromatic ring group or an alicyclic group and/or an alkylene group which may have a double bond, Z represents —NHCO— or —CONH—, and Y represents a single bond, an alkylene group, an arylene group, or —$R^{Y1}$—NH—$R^{Y2}$— (in which $R^{Y1}$ and $R^{Y2}$ each independently represents an alkylene group) and $R^a$ each independently represents a hydrocarbon group, provided that, U and/or Y may have, as a substituent, at least one group selected from the group consisting of a (meth)acryl group, a vinyl group, and an epoxy group.

Examples of the aromatic ring in the U include aromatic rings having 6 to 10 carbon atoms which may have a substituent having 1 to 2 carbon atoms (for example, a benzene ring, a napththalene ring, a tolyl group, a xylyl group, etc.). Examples of the alicycle in the U include alicycles having 5 to 10 carbon atoms (for example, a monocyclic cycloalkyl group, a monocyclic cycloalkenyl group, a bicyclic alkyl group, a cage-like alkyl group, and specific examples thereof include a cyclopentane ring, a cyclohexane ring, a cycloheptane ring, a cyclooctane ring, a cyclononane ring, a cyclodecane ring, a dicyclopentadiene ring, a norbornane ring, a norbornene ring, a cubane ring, and a basketane ring). The branched chain and/or the alkylene group which may have a double bond in the U include alkylene groups having 1 to 4 carbon atoms, and examples thereof include alkylene groups such as a methylene group, an ethylene group, a propylene group, a vinylene group, a (2-octenyl)ethylene group, and a (2,4,6-trimethyl-2-nonenyl)ethylene group, alkylene group having a double bond, or an alkylene group having a branched chain with 1 to 9 carbon atoms.

Examples of the alkylene group in the Y include alkylene groups having 1 to 6 carbon atoms, and examples thereof include a methylene group, an ethylene group, a propylene group, and a butylene group. The arylene group in the Y is preferably an arylene group having 6 to 10 carbon atoms. Examples thereof include a phenylene group (ortho, meta, or para), a naphthylene group (1,4-, 1,5-, 2,6-, etc.) and the like. Specific examples of —$R^{Y1}$—NH—$R^{Y2}$— in the Y include —CH$_2$—NH—CH$_2$—, —(CH$_2$)$_2$—NH—(CH$_2$)$_2$—, —(CH$_2$)$_3$—NH—(CH$_2$)$_3$—, —CH$_2$—NH—(CH$_2$)$_2$—, —(CH$_2$)$_2$—NH—CH$_2$—, —(CH$_2$)$_2$—NH—(CH$_2$)$_3$—, —(CH$_2$)$_3$—NH—(CH$_2$)$_2$—, —CH$_2$—NH—(CH$_2$)$_3$—, —(CH$_2$)$_3$—NH—CH$_2$— and the like.

There is no particular limitation on the conditions of the hydrolysis and condensation reaction of at least one silicon compound selected from the group consisting of silicon compounds represented by the above general formulas (A-1-1) to (A-1-4) as long as the hydrolysis and condensation reaction proceeds, and it is possible to use known conditions. In that case, a catalyst may be used and examples of the catalyst include tetrabutylammonium hydroxide, benzyltrimethylammonium hydroxide, benzyltriethylammonium hydroxide, tetramethylammonium hydroxide, tetrabutylammonium hydroxide, hydrochloric acid, sulfuric acid, formic acid, and oxalic acid. It is possible to use, as the reaction conditions, for example, 1 to 10 hours at 25 to 100° C.

It is preferred that the polysilane structures (I-1) and (II-1) each independently includes a structure derived from at least one selected from the group consisting of polysilane compounds represented by the following general formulas (A-2-1) and (A-2-2):

$$(R^7R^8R^9Si)_{a1}(R^{10}R^{11}Si)_{a2}(R^{12}Si)_{a3}(Si)_{a4} \quad (A-2-1)$$

in the above general formulas, $R^7$, $R^8$, $R^9$, $R^{10}$, $R^{11}$, and $R^{12}$ are each independently a hydrogen atom, a hydroxyl group, or an organic group, a1, a2, a3, and a4 are each independently a molar fraction, a1+a2+a3+a4=1, 0≤a1≤1, 0≤a2≤1, 0≤a3≤1, and 0≤a4≤1,

[Chem. 1]

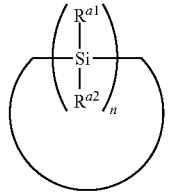

(A-2-2)

in the above general formula (A-2-2), $R^{a1}$ and $R^{a2}$ each independently represents a hydrogen atom, a hydroxyl group, or an organic group, and n represents an integer of 3 to 20. It is possible to exemplify, as the organic groups represented by $R^7$ to $R^6$, $R^{a1}$, and $R^{a2}$, those which are the same as specific examples and preferred examples mentioned above as the organic groups represented by $R^1$ to $R^6$. It is possible to introduce, as the organic groups represented by $R^7$ to $R^{12}$, $R^{a1}$, and $R^{a2}$, optional organic groups by the method mentioned in Japanese Unexamined Patent Application, Publication No. 2003-261681, paragraph 0031.

((I) Polysilane-Polysiloxane Resin)

(I) A polysilane-polysiloxane resin has a polysilane structure (I-1) and a polysiloxane structure (I-2). (I) The polysilane-polysiloxane resin is preferably a polysilane-polysiloxane resin in which the polysilane structure (I-1) is connected to the polysiloxane structure (I-2) via an oxygen atom (ether bond (—O—)). (I) The polysilane-polysiloxane resin is easily decomposed by an action of an alkali developing solution because of comparatively stable bond of a connecting part (for example, ether bond) between the polysilane structure and the polysiloxane structure to an Si—Si bond in the polysilane structure and an Si—O bond in the polysiloxane structure. Therefore, the resin composition is excellent in alkali developability when the resin composition contains (I) the polysilane-polysiloxane resin. When the resin composition comprises the polysilane-polysiloxane resin, the resin composition may be either positive or negative, but is preferably positive. It is preferred to comprise, as (I) the polysilane-polysiloxane resin, at least one selected from the group consisting of structures represented by the following general formulas (H1) and (H2):

[Chem. 2]

$$A^1\text{-}A^2O\text{—}Psi\text{-}OA^2\text{-}A^1 \quad (H1)$$

$$A^1\text{-}A^2O\text{—}Psi\text{-}OH \quad (H2)$$

in the general formulas (H1) and (H2), $A^1$ each independently represents a polysiloxane structure which includes at least one of structures represented by the general formulas (A1) shown below, and also includes at least one leftmost structure, $A^2O$— each independently represents a linking group which is any one of structures represented by the general formula (A2) shown below, in the general formulas (H1), —$OA^2$-represents an —OSi— structure in which the order of bonding a main chain —SiO— in the general formula (A1) shown below is reversed, Psi represents a polysilane structure (I-1):

[Chem. 3]

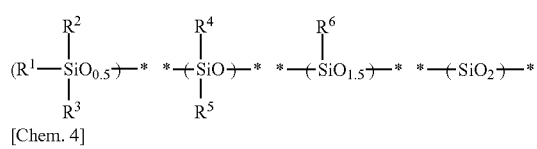
(A1)

[Chem. 4]

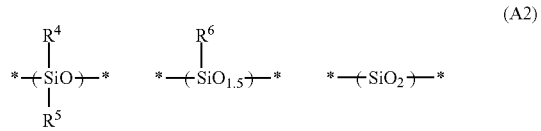
(A2)

in the general formulas (A1) and (A2), $R^1$, $R^2$, $R^3$, $R^4$, $R^5$, and $R^6$ are each independently a hydrogen atom or an organic group, and hydrogen atoms in the organic group may be substituted with a halogen atom. Specific examples and preferred examples of the organic groups represented by $R^1$ to $R^6$ are as mentioned above.

The polysilane structure (I-1) represented by Psi includes a polysilane structure having 3 to 40 Si atoms, and is preferably a polysilane structure having 5 to 30 Si atoms. Preferably, the polysilane structure (I-1) represented by Psi includes at least one of polysilane structures represented by the following general formula (B1):

[Chem. 5]

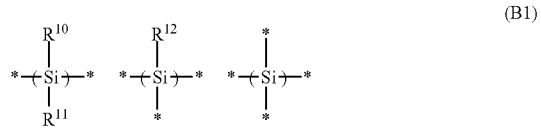
(B1)

in the general formula (B1), $R^{10}$, $R^{11}$, and $R^{12}$ each independently represents a hydrogen atom, a hydroxyl group, or an organic group, and the symbol * represents a bond. More preferably, the polysilane structure (I-1) represented by Psi includes a polysilane structure represented by the following general formula (B1-1) since it becomes easy to remove a resin composition film when the resin composition film is removed or lithography performance is imparted to a resin composition in the case of processing in the production process:

[Chem. 6]

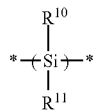
(B1-1)

in the general formula (B1-1), the symbol *, $R^{10}$, and $R^{11}$ are the same as defined in the general formula (B1). It is possible to exemplify, as the organic groups represented by $R^{10}$ to $R^{12}$, those which are the same as specific examples and preferred examples mentioned above as the organic groups represented by $R^1$ to $R^6$.

One specific example of the structure represented by the general formula (H1) includes a structure represented by the following general formula (H3):

[Chem. 7]

$$A^1\text{-}A^2O\text{—}Psi\text{-}OA^2\text{-}A^1\text{-}A^2O\text{—}Psi\text{-}OA^2\text{-}A^1 \quad (H3)$$

in the general formulas (H3), $A^1$, -$A^2O$—, —$OA^2$-, and Psi are the same as defined in the general formula (H1).

A mass average molecular weight (Mw) of (I) the polysilane-polysiloxane resin is not particularly limited as long as it does not interfere with the object of the present invention, and is preferably in a range of 500 to 20,000, more preferably 1,000 to 10,000, and still more preferably 2,000 to 8,000. The mass average molecular weight (Mw) as used herein is a measured value calculated as polystyrene according to gel permeation chromatography (GPC).

((I) Method for Producing Polysilane-Polysiloxane Resin)

It is possible to produce (I) a polysilane-polysiloxane resin by performing a hydrolysis and condensation reaction of at least one silicon compound selected from the group consisting of silicon compounds represented by the general formulas (A-1-1) to (A-1-4) mentioned below, and at least one selected from the group consisting of a hydrolyzate, a condensate, and a hydrolyzed condensate of the silicon compound with a resin having a polysilane structure.

The resin having a polysilane structure to be used in the production is preferably at least one selected from the group consisting of polysilane compounds represented by the general formulas (A-2-1) and (A-2-2).

There is no particular limitation on the hydrolysis and condensation reaction conditions as long as the hydrolysis and condensation reaction proceeds. For example, the hydrolysis and condensation reaction can be performed using, as an acid catalyst, one or more compounds selected from an inorganic acid, an aliphatic sulfonic acid, and an aromatic sulfonic acid. Examples of the acid catalyst to be used include hydrofluoric acid, hydrochloric acid, hydrobromic acid, sulfuric acid, nitric acid, perchloric acid, phosphoric acid, methanesulfonic acid, benzenesulfonic acid, toluenesulfonic acid and the like. The amount of the catalyst to be used is preferably in a range of $10^{-6}$ to 10 mol, more preferably $10^{-5}$ to 5 mol, and still more preferably $10^{-4}$ to 1 mol, based on 1 mol of silicon compounds represented by the above general formulas (A-1-1) to (A-1-4).

The amount of water to be added when the silicon compounds represented by the general formulas (A-1-1) to (A-1-4) are subjected to hydrolysis condensation is preferably in a range of 0.01 to 100 mol, more preferably 0.05 to 50 mol, and still more preferably 0.1 to 30 mol, based on 1 mol of a hydrolyzable group possessed by the silicon compounds represented by the above general formulas (A-1-

1) to (A-1-4). The reaction temperature is preferably in a rage of 0 to 100° C., and more preferably 5 to 80° C.

The organic solvent, which can be added to the aqueous catalyst solution, is preferably methanol, ethanol, 1-propanol, 2-propanol, 1-butanol, 2-butanol, 2-methyl-1-propanol, acetone, acetonitrile, tetrahydrofuran, toluene, hexane, ethyl acetate, cyclohexanone, methyl amyl ketone, butanediol monomethyl ether, propylene glycol monomethyl ether, ethylene glycol monomethyl ether, butanediol monoethyl ether, propylene glycol monoethyl ether, ethylene glycol monoethyl ether, propylene glycol dimethyl ether, diethylene glycol dimethyl ether, propylene glycol monomethyl ether acetate, propylene glycol monoethyl ether acetate, ethyl pyruvate, butyl acetate, methyl 3-methoxypropionate, ethyl 3-ethoxypropionate, t-butyl acetate, t-butyl propionate, propylene glycol mono-t-butyl ether acetate, γ-butyrolactone, and mixtures thereof.

Among these solvents, water-soluble solvents are more preferable. Examples thereof include alcohols such as methanol, ethanol, 1-propanol, and 2-propanol; polyhydric alcohols such as ethylene glycol and propylene glycol; polyhydric alcohol condensate derivatives such as butanediol monomethyl ether, propylene glycol monomethyl ether, ethylene glycol monomethyl ether, butanediol monoethyl ether, propylene glycol monoethyl ether, ethylene glycol monoethyl ether, butanediol monopropyl ether, propylene glycol monopropyl ether, and ethylene glycol monopropyl ether; acetone, acetonitrile, tetrahydrofuran and the like. Among these solvents, solvents having a boiling point of 100° C. or lower are particularly preferable.

It is also possible to preferably use, as the organic solvent, at least one solvent selected from the group consisting of a terpene compound having at least one group selected from the group consisting of a hydroxy group and an acetoxy group and cyclic skeleton-containing acetate compounds (excluding the terpene compound) mentioned below. The amount of the organic solvent to be used is preferably in a range of 0 to 1,000 mL, and particularly preferably 0 to 500 mL, based on 1 mol of the silicon compounds represented by the above general formulas (A-1-1) to (A-1-4).

Thereafter, a neutralization reaction of the catalyst may be optionally performed, followed by removal of an alcohol produced by a hydrolysis and condensation reaction under reduced pressure to obtain an aqueous reaction mixture solution.

It is possible to prepare a polysilane compound represented by the general formula (A-2-1) or (A-2-2) by applying various methods for producing a polysilane. Examples of the method include (a) a method in which halosilanes are subjected to dehalogenation polycondensation using magnesium as a reducing agent ("magnesium reduction method", methods mentioned in WO 98/29476 A and Japanese Unexamined Patent Application, Publication No. 2003-277507, etc.), (b) a method in which dialkyldihalosilane or dihalotetraalkyldisilane in a toluene solvent is reductively coupled by vigorous stirring at a temperature of 100° C. or higher using alkali metal such as metallic sodium [J. Am. Chem. Soc., 103(1981)7352], (c) a method in which disilene masked with biphenyl is subjected to anionic polymerization (Japanese Unexamined Patent Application, Publication No. 1-23063), (d) a method in which cyclic silanes are subjected to ring-opening polymerization (Japanese Unexamined Patent Application, Publication No. 5-170913), (e) a method in which hydrosilanes are subjected to dehydrogenation polycondensation by a transition metal complex catalyst (Japanese Examined Patent Application, Publication No. 7-17753), (f) a method in which dihalosilanes are electroreduced at a temperature of room temperature or lower to produce polysilane (Japanese Unexamined Patent Application, Publication No. 7-309953) and the like, and the magnesium reduction method is preferable.

It is also possible to use, as the polysilane compound represented by the above general formula (A-2-1) or (A-2-2), commercially available products such as OGSOL SI-10-10 (polymethylphenylsilane), SI-10-20 (polymethylphenylsilane), SI-20-10 (polyphenylsilane), SI-20-10 (revised) (polyphenylsilane), and SI-30-10 (cyclic polydiphenylsilane) manufactured by OSAKA GAS CHEMICALS CO. LTD. It is also possible to use those obtained by lowering the molecular weight of these commercially available products under the following basic conditions.

((II) Mixture of Resin Having Polysilane Structure (II-1) and Resin Having Polysilane Structure (II-2))
((Resin Having Polysilane Structure (II-1))

The resin having a polysilane structure (II-1) includes a resin having a polysilane structure with 3 to 40 Si atoms, and is preferably a resin having a polysilane structure with 5 to 30 Si atoms. The resin having a polysilane structure (II-1) preferably includes at least one of polysilane structures represented by the above general formula (B1), and more preferably a polysilane structure represented by the above general formula (B1-1). The resin having a polysilane structure (II-1) is preferably at least one selected from the group consisting of polysilane compounds represented by the general formulas (A-2-1) and (A-2-2).

A mass average molecular weight (Mw) of the resin having a polysilane structure (II-1) is not particularly limited as long as it does not interfere with the object of the present invention, and is preferably in a range of 500 to 20,000, more preferably 1,000 to 10,000, and still more preferably 2,000 to 5,000.

((Resin Having Polysiloxane Structure (II-2)))

The resin having a polysiloxane structure (II-2) preferably comprises a hydrolyzed and condensed structure of a mixture containing at least one selected from the group consisting of silicon compounds represented by the above general formulas (A-1-1) to (A-1-4), and more preferably at least one of polysiloxane structures represented by the general formula (A1). It is possible to produce the resin having a polysiloxane structure (II-2) by a hydrolysis and condensation reaction of a mixture containing at least one selected from the group consisting of silicon compounds represented by the above general formulas (A-1-1) to (A-1-4).

A mass average molecular weight (Mw) of the resin having a polysiloxane structure (II-2) is not particularly limited as long as it does not interfere with the object of the present invention, and is preferably in a range of 500 to 20,000, and more preferably 1,000 to 10,000.

In the resin composition according to the first aspect, a mixing ratio of the resin having a polysilane structure (II-1) to the resin having a polysiloxane structure (II-2) is not particularly limited as long as the effects of the present invention are not impaired, and is preferably in a range of 0.01 to 5 mass times, and more preferably 0.05 to 1 mass times.

<Solvent>

The resin composition according to the first aspect contains, as the solvent, at least one solvent selected from the group consisting of a terpene compound having at least one group selected from the group consisting of a hydroxy group and an acetoxy group, and a cyclic skeleton-containing acetate compound (excluding the terpene compound), and the solvent is preferably a cyclic skeleton-containing acetate compound from the viewpoint of in-plane uniformity.

(Terpene Compound Having at Least One Group Selected from Group Consisting of Hydroxy Group and Acetoxy Group)

The terpene compound having at least one group selected from the group consisting of a hydroxy group and an acetoxy group is preferably terpineol, dihydroterpineol, 4-(acetyloxy)-α,α,4-trimethylcyclohexanemethanol acetate, 2-[1-methyl-1-(4-methyl-3-cyclohexen-1-yl)ethoxy]ethanol or the like. Terpineol has the following α-, β-, and γ-isomers and is put on the market from The Nippon Koryo Yakuhin Kaisha. Ltd. and Nippon Terpene Chemicals, Inc.

[Chem. 8]

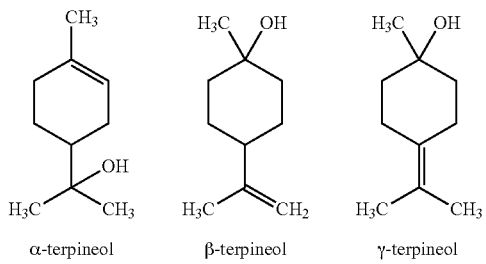

α-terpineol    β-terpineol    γ-terpineol

Dihydroterpineol has the following two compounds (1-hydroxy-p-menthane and 8-hydroxy-p-menthane) and is put on the market as dihydroterpineol and Terusolve DTO-210 from Nippon Terpene Chemicals, Inc.

[Chem. 9]

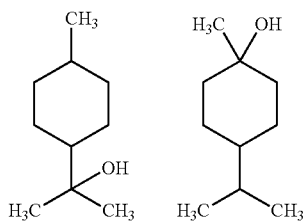

4-(acetyloxy)-α,α,4-trimethylcyclohexanemethanol acetate is a compound represented by the following formula C-3, and is put on the market as a mixture of a compound represented by the formula C-1 and a compound represented by the formula C-2, for example, Terusolve THA-90 and Terusolve THA-70 from Nippon Terpene Chemicals, Inc.

[Chem. 10]

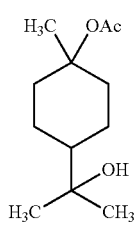
(C-1)

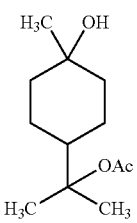
(C-2)

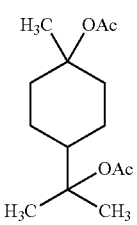
(C-3)

2-[1-methyl-1-(4-methyl-3-cyclohexen-1-yl)ethoxy]ethanol is a compound represented by the following formula and is put on the market as Terusolve TOE-100 from Nippon Terpene Chemicals, Inc.

[Chem. 11]

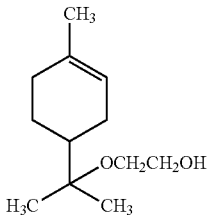

Among these, terpineol, dihydroterpineol, Terusolve THA-90, Terusolve THA-70, and Terusolve TOE-100 are preferable, dihydroterpineol, Terusolve THA-90, and Terusolve THA-70 are more preferable, and Terusolve THA-90 and Terusolve THA-70 are still more preferable. The terpene compound may be used alone or in combination of two or more.

When the resin composition according to the first aspect comprises, as the solvent, a terpene compound having at least one group selected from the group consisting of a hydroxy group and an acetoxy group, the resin composition may also comprise, as a cosolvent, an organic solvent having a viscosity at 20° C. of less than 50 mPa·s. The viscosity at 20° C. of the cosolvent is preferably 10 mPa·s or less, more preferably 5 mPa·s or less, and still more preferably 3 mPa·s or less. The lower limit is not particularly limited, and is preferably 0.5 mPa·s or more.

It is possible to use, as the organic solvent having a viscosity at 20° C. of 50 mPa·s, known solvents, and examples thereof include alcohols, ethylene glycol monoalkyl ethers, ethylene glycol dialkyl ethers, ethylene glycol monoalkyl ether acetates, propylene glycol monoalkyl ethers, propylene glycol dialkyl ethers, propylene glycol monoalkyl ether acetates, diethylene glycol dialkyl ethers, diethylene glycol monoalkyl ether acetates, dipropylene glycol monoalkyl ethers, butylene glycol diacetates, dipropylene glycol dialkyl ethers, dipropylene glycol monoalkyl ether acetates, esters, ketones, amides, lactones and the like. Regarding other specific examples, it is possible to make reference to Japanese Unexamined Patent Application, Publication No. 2009-098616, paragraph 0062. Of these solvents, preferred specific examples include butanol, tetrahydrofurfuryl alcohol, phenoxyethanol, 1,3-butylene glycol diacetate, diethylene glycol methyl ethyl ether, propylene glycol monomethyl ether acetate, acetylacetone, and ethyl lactate, and particularly preferred examples include butanol, 1,3-butylene glycol diacetate, diethylene glycol methyl ethyl ether, acetylacetone, and ethyl lactate. The organic solvent having a viscosity at 20° C. of 50 mPa·s may be used alone or in combination of two or more.

The boiling point of the organic solvent having a viscosity at 20° C. of 50 mPa·s is preferably in a range of 100° C. to 300° C., more preferably 120° C. to 250° C., and still more preferably 120° C. to 200° C., from the viewpoint of coatability.

(Cyclic Skeleton-Containing Acetate Compound)

The cyclic skeleton-containing acetate compound (excluding the terpene compound) is not particularly limited as long as it is an acetate-based solvent having a cyclic skeleton which does not impair the effects of the present invention, and is preferably cycloalkyl acetate represented by the following formula (S1):

[Chem. 12]

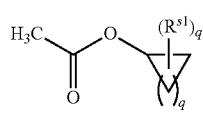

(S1)

in the formula (S1), $R^{s1}$ are each independently an alkyl group, p is an integer of 1 to 6, and q is an integer of 0 to (p+1). The alkyl group represented by $R^{s1}$ include alkyl groups having 1 to 3 carbon atoms, and examples thereof include a methyl group, an ethyl group, an n-propyl group, and an i-propyl group.

Specific examples of the cycloalkyl acetate represented by the formula (S1) include cyclopropyl acetate, cyclobutyl acetate, cyclopentyl acetate, cyclohexyl acetate, cycloheptyl acetate, and cyclooctyl acetate. Among these, cyclooctyl acetate is preferable from the viewpoint of easy availability. The cyclic skeleton-containing acetate compound may be used alone or in combination of two or more.

The solvent in the resin composition according to the first aspect is preferably contained so that the total solid content of the resin composition according to the first aspect becomes 3 to 30% by mass. The total solid content is more preferably in a range of 5 to 20% by mass, and still more preferably 8 to 15% by mass. Namely, total solid content: total solvent (parts by mass) is preferably 8:92 to 30:70, more preferably 5:95 to 20:80, and still more preferably 8:92 to 15:85. The solvent may be used alone or in combination of two or more.

<Other Components>

The resin composition according to the first aspect may comprise an organic compound having two or more hydroxyl groups or carboxyl groups in a molecule. Examples of such organic compound include the following compounds.

[Chem. 13]

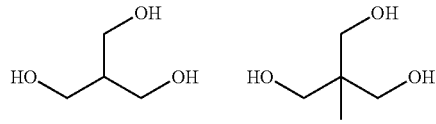

-continued

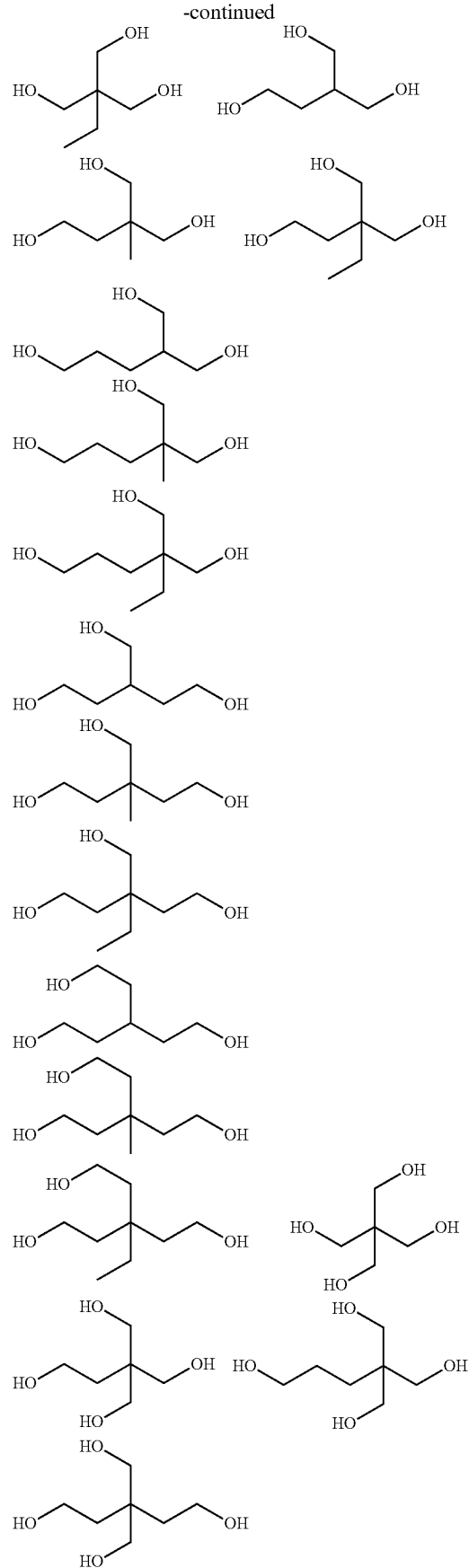

-continued
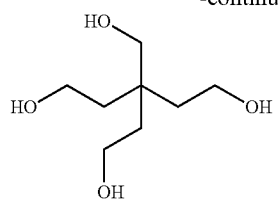
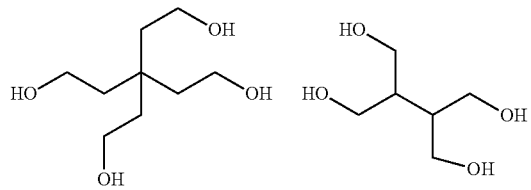
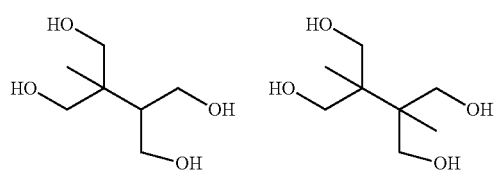
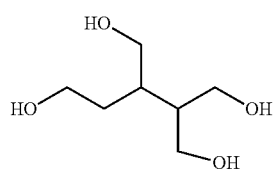
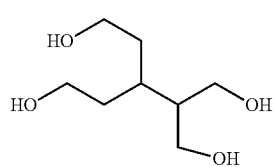
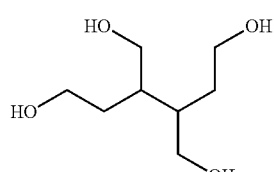
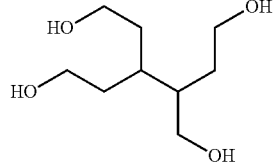
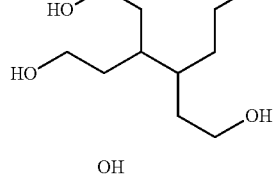
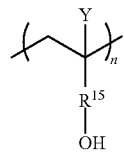
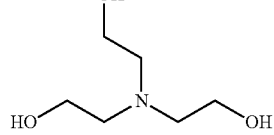
-continued
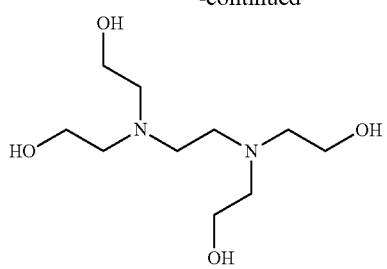
[Chem. 14]
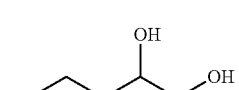
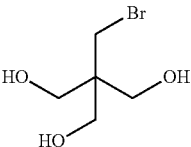
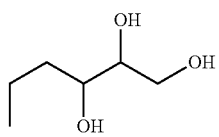
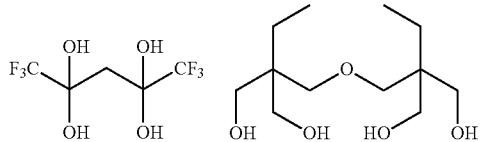
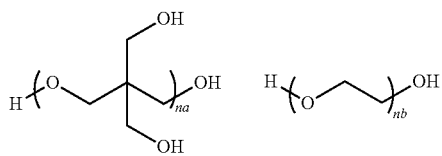
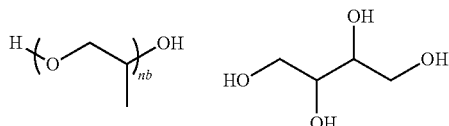
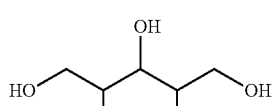
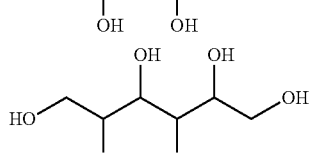
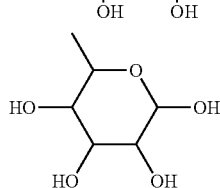
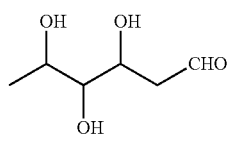

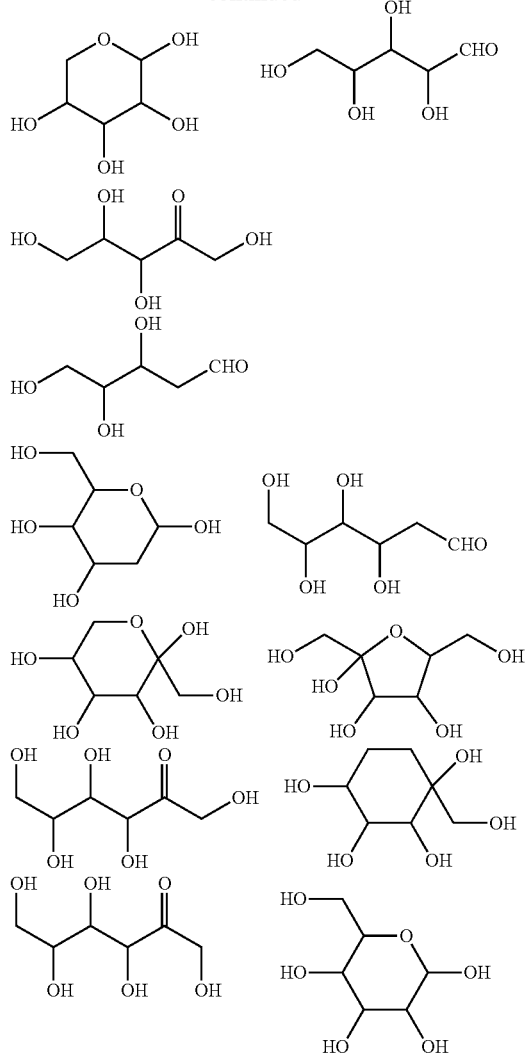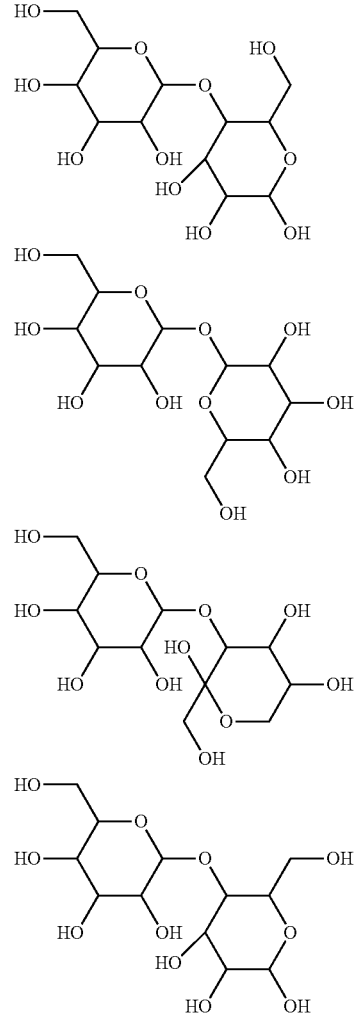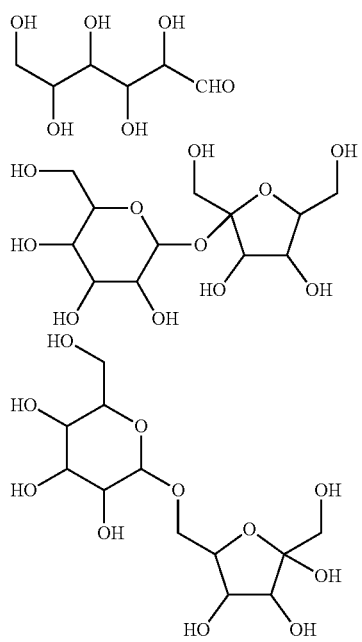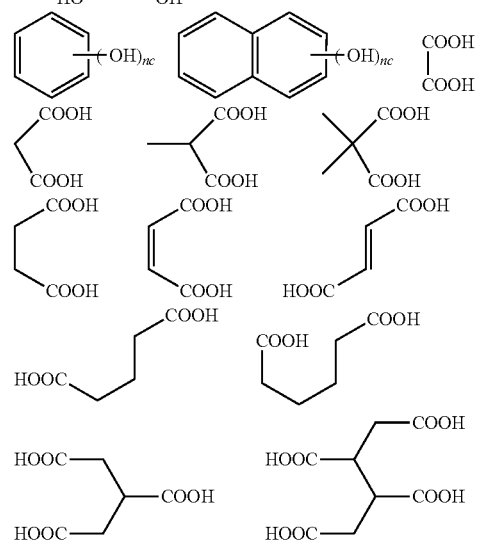

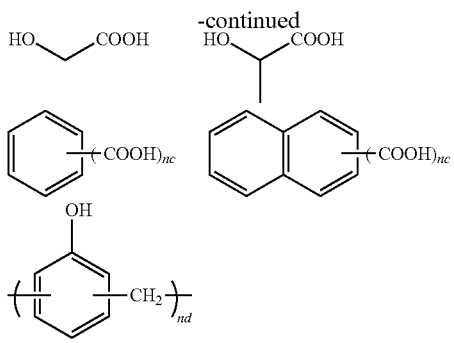

Y in the structural formula is a hydrogen atom, a methyl group, or a hydroxymethyl group, $R^{15}$ is a methylene group, a carbonyl group, or a phenylene group, and n is an integer of 3 or more and less than 100. na represents a natural number of 1 to 3, nb represents a natural number of 1 or more, nc represents a natural number of 2 to 4, and nd represents a natural number of 2 or more. In the above structural formulas, an enantio isomer (enantiomer) and a diastereo isomer (diastereomer) can exist, and each structural formula is representative for all of these isomers. These stereoisomers may be used alone or as a mixture.

The organic compound can be used alone or in combination of two or more. The amount of the organic compound to be used is preferably in a range of 0.001 to 50% by mass, and more preferably 0.01 to 30% by mass, based on the total amount of the solid content of the resin composition according to the first aspect, excluding the solvent. The addition of such organic compound leads to acceleration of collapse of a resin composition film is accelerated, thus making it easy to peel the resin composition film when the resin composition film is removed or lithography performance is imparted to a resin composition in the case of processing in the production process.

The resin composition according to the first aspect may comprise a thermal crosslinking accelerator. Usable thermal crosslinking accelerator specifically includes a thermal crosslinking accelerator mentioned in Japanese Unexamined Patent Application, Publication No. 2007-302873. The thermal crosslinking accelerator can be used alone or in combination of two or more. The amount of the thermal crosslinking accelerator to be added is preferably in a range of 0.01 to 50% by mass, and more preferably 0.1 to 40% by mass, based on the total amount of the solid content of the resin composition according to the first aspect, excluding the solvent.

To improve the stability, the resin composition according to the first aspect may comprise a monohydric or dihydric or higher polyhydric organic acid having 1 to 30 carbon atoms. Examples of the acid to be added include formic acid, acetic acid, propionic acid, butanoic acid, pentanoic acid, hexanoic acid, heptanoic acid, octanoic acid, nonanoic acid, decanoic acid, oleic acid, stearic acid, linoleic acid, linolenic acid, benzoic acid, phthalic acid, isophthalic acid, terephthalic acid, salicylic acid, trifluoroacetic acid, monochloroacetic acid, dichloroacetic acid, trichloroacetic acid, oxalic acid, malonic acid, methylmalonic acid, ethylmalonic acid, propylmalonic acid, butylmalonic acid, dimethylmalonic acid, diethylmalonic acid, succinic acid, methylsuccinic acid, glutaric acid, adipic acid, itaconic acid, maleic acid, fumaric acid, citraconic acid, citric acid and the like. Among these acids, oxalic acid, maleic acid, formic acid, acetic acid, propionic acid, citric acid and the like are preferable. To maintain the stability, two or more acids may be used in combination. It is preferred to mix the organic acid so that the pH calculated as the composition preferably satisfies the inequality expression $0 \leq pH \leq 7$, more preferably $0.3 \leq pH \leq 6.5$, and still more preferably $0.5 \leq pH \leq 6$.

The resin composition according to the first aspect may comprise, as the stabilizer, a monohydric or dihydric or higher polyhydric alcohol which has cyclic ether as a substituent, or an ether compound. Specific examples of usable stabilizer include stabilizers mentioned in Japanese Unexamined Patent Application, Publication No. 2009-126940, paragraphs (0180) to (0184).

The resin composition according to the first aspect may comprise water. The addition of water leads to an improvement in lithographic performance. The content of water in a solvent component of the resin composition according to the first aspect is preferably in a range of more than 0% by mass and less than 50% by mass, more preferably 0.3 to 30% by mass, and still more preferably 0.5 to 20% by mass.

The resin composition according to the first aspect may comprise a photo acid generator. Specific examples of usable photo acid generator include photo acid generators mentioned in Japanese Unexamined Patent Application, Publication No. 2009-126940, paragraphs (0160) to (0179).

The resin composition according to the first aspect may optionally comprise a surfactant. Specific examples of usable surfactant include surfactants mentioned in Japanese Unexamined Patent Application, Publication No. 2009-126940, paragraph (0185).

To the resin composition according to the first aspect, a phosphate compound and a borate compound may be optionally added as a thermal crosslinking accelerator. Examples of such phosphate compound include ammonium salts such as ammonium phosphate, tetramethylammonium phosphate, and tetrabutylammonium phosphate; and sulfonium salts such as triphenylsulfonium phosphate. Examples of such borate compound include ammonium salts such as ammonium borate, etramethylammonium borate, and tetrabutylammonium borate; and sulfonium salts such as triphenylsulfonium borate. It is also possible to use the thermal crosslinking accelerator alone or in combination of two or more. The amount of the thermal crosslinking accelerator to be added is preferably in a range of 0.01 to 50% by mass, and more preferably 0.1 to 40% by mass, based on the total amount of the solid content of the silicon-containing composition, excluding the solvent.

The composition according to the first aspect may comprise other various curing agents. Examples of the curing agent include Broensted acids; imidazoles; organic amines; organophosphorous compounds and complexes thereof; organoamine complexes of Lewise acids; amidines; and curing agents which generate a base component by light or heat.

<Applications>

The resin composition according to the first aspect can be used in applications for formation of a protective film or an interlayer film which protects various substrates (including a metal oxide-containing film, various metals-containing films). Examples of various substrates include substrates for display materials (including a metal oxide-containing film, a film containing various metals) such as a semiconductor substrate, a liquid crystal display, an organic light-emitting display (OLED), an electrophoretic display (electronic paper), a touch panel, a color filter, and a back light; substrates for solar cells; substrates for photoelectric conversion elements (including a metal oxide-containing film, a film containing various metals) such as an optical sensor;

and substrates for photoelectric devices (including a metal oxide-containing film, a film containing various metals).

<<Method for Producing Resin Composition>>

The method for producing a resin composition according to the second aspect includes:
at least one step selected from the group consisting of the steps of: performing a hydrolysis and condensation reaction of at least one silicon compound selected from the group consisting of silicon compounds represented by the general formulas (A-1-1) to (A-1-4) mentioned below, and at least one selected from the group consisting of a hydrolyzate, a condensate, and a hydrolyzed condensate of the silicon compound with a resin having a polysilane structure to obtain the above-mentioned (I) polysilane-polysiloxane resin, and mixing the resin having a polysilane structure (II-1) with the resin having a polysiloxane structure (II-2). The resin having a polysilane structure is preferably at least one selected from the group consisting of polysilane compounds represented by the general formulas (A-2-1) and (A-2-2). A mixing ratio of the resin having a polysilane structure (II-1) to the resin having a polysiloxane structure (II-2) is not particularly limited as long as the effects of the present invention are not impaired, and the mixing ratio of the resin having a polysilane structure (II-1) to the resin having a polysiloxane structure (II-2) is preferably in a range of 0.01 to 5 mass times, and more preferably 0.05 to 1 mass times.

In the method for producing a resin composition according to the second aspect, it is possible to preferably use at least one solvent selected from the group consisting of a terpene compound having at least one group selected from the group consisting of a hydroxy group and an acetoxy group, and a cyclic skeleton-containing acetate compound (excluding the terpene compound).

In the second aspect, it is preferred to include treating at least one polysilane compound selected from the group consisting of polysilane compounds represented by the general formulas (A-2-1) and (A-2-2) under basic conditions. In the production of the polysilane-polysiloxane resin, when the polysilane compound is subjected to a treatment (for example, a purification treatment) under basic conditions before performing a hydrolysis and condensation reaction with at least one selected from the group consisting of a hydrolyzate, a condensate, and a hydrolyzed condensate of at least one silicon compound selected from the group consisting of silicon compounds represented by the above general formulas (A-1-1) to (A-1-4), it is possible to remove impurities such as halogen atoms (for example, halogen ions (chloride ions, etc.) and Si—Cl remaining in the polysilane compound) and to accelerate lowering of the molecular weight of the polysilane compound, leading to an improvement in solvent solubility of the polysilane compound. Whereby, the polysilane compound can be suitably used in the production of a polysilane-polysiloxane resin.

Various solvents can be used as the solvent to be used in the treatment under basic conditions. For example, it is possible to use one or more solvents selected from hydrocarbon-based solvents such as cycloalkyl acetate represented by the above (S1), benzene, toluene, and xylene; glycol-based solvents such as propylene glycol monomethyl ether and propylene glycol monoethyl ether; ether-based solvents such as diethyl ether, diisopropyl ether, dibutyl ether, tetrahydrofuran, and 1,4-dioxane; ketone-based solvents such as acetone, methyl ethyl ketone, methyl isobutyl ketone, methyl amyl ketone, cyclopentanone, and cyclohexanone; and alcohol-based solvents such as ethanol, isopropyl alcohol, and butanol.

It is also possible to use, as the solvent to be used in the treatment under basic conditions, at least one solvent selected from the group consisting of the above-mentioned terpene compound having at least one group selected from the group consisting of a hydroxy group and an acetoxy group, and cyclic skeleton-containing acetate compound (excluding the terpene compound).

It is possible to use, as the base, various bases as long as they are compounds exhibiting basicity, for example, inorganic bases such as sodium hydroxide, potassium hydroxide, barium hydroxide, ammonia, tetramethylammonium hydroxide, sodium carbonate, sodium hydrogen carbonate, potassium carbonate, lithium hydride, sodium hydride, potassium hydride, and calcium hydride; alkyl metals such as methyl lithium, n-butyl lithium, methylmagnesium chloride, and ethylmagnesium bromide; metal halides composed of metals (or metal ions) such as Cr, Ga, Fe (Fe(II), Fe(III)), Cd, Co, Ni, Sn, Pb, Cu (Cu(II), Cu(I)), Ag, Pd, Pt, and Au; alkoxides such as sodium methoxide, sodium ethoxide, and potassium t-butoxide; and organic bases such as triethylamine, diisopropylethylamine, N,N-dimethylaniline, pyridine, 4-dimethylaminopyridine, and diazabicycloundecene (DBU). The reaction temperature is preferably in a range of about −50° C. to a boiling point of the solvent, and more preferably room temperature to 100° C.

<<Film Formation Method>>

The film formation method according to the third aspect uses the resin composition according to the first aspect. The method of forming a film using the resin composition according to the first aspect is not particularly limited as long as the effects of the present invention are not impaired, and includes a method of applying the resin composition onto an optional support, using optionally contact transfer coating applicators such as a roll coater, a reverse coater, and a bar coater; and on-contact applicators such as a spinner (rotary applicator) and a curtain flow coater. Examples of the support include, but are not limited to, a glass substrate, a quartz substrate, a transparent or translucent resin substrate (for example, heat-resistant materials such as polycarbonate, polyethylene terephthalate, polyether sulfone, polyimide, and polyamideimide), metal, a silicon substrate and the like. The support may be various substrates, for example, substrates for display materials (including a metal oxide-containing film, a film containing various metals) such as a semiconductor substrate, a liquid crystal display, an organic light-emitting display (OLED), an electrophoretic display (electronic paper), a touch panel, a color filter, and a back light; substrates for solar cells; substrates for photoelectric conversion elements (including a metal oxide-containing film, a film containing various metals) such as an optical sensor; and substrates for photoelectric devices (including a metal oxide-containing film, a film containing various metals). The thickness of the support is not particularly limited and can be appropriately selected according to embodiment of usage of a pattern forming material.

After application, the coating film is preferably dried (prebaked). The drying method is not particularly limited and includes, for example, (1) a method of drying with a hot plate at a temperature in a range of 80 to 120° C., and preferably 90 to 100° C., for 60 to 120 seconds, (2) a method of allowing to stand at room temperature for several hours to several days, (3) a method of placing in a hot-air heater or an infrared heater for several tens of minutes to several hours to remove the solvent and the like.

After drying, the coating film may be exposed or not by irradiating with active energy rays such as ultraviolet rays and excimer laser. The energy-ray exposure dose is not particularly limited and is, for example, in a range of about 30 to 2,000 mJ/cm². The exposure step may be performed in place of or together with the below-mentioned baking step. In the exposure step, for example, the thus formed coating film may be selectively exposed and, when including the selective exposure step, the developing step may also be included. For example, the thus formed coating film may be subjected to imprint lithography. When imprint lithography is formed, there is exemplified, for example, a method including the steps of: applying the resin composition according to the first aspect onto a substrate to form a coating film, pressing a mold, on which an irregular structure of a predetermined pattern is formed, against the coating film, and performing exposure. The exposure step is performed against the coating film composed of the resin composition according to the first aspect in a state where the mold is pressed against the coating film. After curing by exposure, the mold is peeled off, thus making it possible to obtain a film according to the third aspect patterned according to a shape of the mold.

After drying, exposure, or development, the coating film is preferably baked (postbaked) in view of enhancing film physical properties. The baking temperature is, for example, in a range of 200 to 1,000° C., preferably 200 to 500° C., and more preferably 200 to 250° C., although it depends on a lower layer substrate and embodiment of usage. The baking atmosphere is not particularly limited and may be an inert gas atmosphere such as a nitrogen atmosphere or argon atmosphere, or may be under vacuum or reduced pressure. The baking atmosphere may be under the atmosphere, or the oxygen concentration may be appropriately controlled. The baking time may be appropriately changed, and is in a range of about 10 minutes to 120 minutes.

The thickness of the film formed by the method according to the fourth aspect is preferably in a range of 10 nm to 10,000 nm, more preferably 50 to 5,000 nm, and still more preferably 100 to 3,000 nm.

<<Cured Product>>

The cured product according to the fourth aspect is a cured product of the resin composition according to the first aspect. The cured product according to the fourth aspect is preferably a protective film which protects various substrates (including a metal oxide-containing film, a film containing various metals).

When the cured product is a film, the thickness is preferably in a range of 10 to 3,000 nm, more preferably 50 to 1,500 nm, and still more preferably 100 to 1,000 nm.

EXAMPLES

The present invention will be described in more detail by way of Examples, but the present invention is not limited to these Examples.

[Synthesis Example 1] Synthesis of Resin Having Polysilane Structure

In a round-bottom flask having an internal volume of 1,000 ml equipped with a three-way cock, 25.0 g of granular (particle diameter of 20 to 1,000 μm)magnesium, 21.4 g of anhydrous lithium chloride, and 4.1 g of ferric chloride were charged. After drying the reaction mixture by heating at 50° C. under reduced pressure of 1 mmHg (=133 kPa), a dry argon gas was introduced into the reactor and 500 ml of tetrahydrofuran dried in advance with sodium-benzophenone ketyl, followed by stirring at room temperature for about 30 minutes. To this reaction mixture, 105.8 g (0.50 mol) of methylphenyldichlorosilane purified in advance by distillation, followed by stirring at 20° C. for about 18 hours. After completion of the reaction, 300 ml of tetrahydrofuran was added, and then magnesium chloride and excess magnesium produced after the reaction by filtration under reduced pressure were removed. The filtrate was washed ten times with 200 ml of pure water and the tetrahydrofuran phase was dried over anhydrous magnesium sulfate, and then tetrahydrofuran was distilled off to obtain 50 g of a methylphenylsilane polymer. The thus obtained methylphenylsilane polymer was dissolved in 300 g of cyclohexyl acetate and mixed with 200 g of an aqueous copper chloride solution further containing 10% by mass of copper(II) chloride (CuCl₂), followed by stirring for 60 minutes and further separation into an organic phase containing polyphenylsiline and an aqueous phase containing copper chloride. After washing the organic phase containing polyphenylsiline three times with 200 ml of pure water, the solvent component was distilled off to obtain 48 g of a methylphenylsilane polymer. This polymer (polysilane resin, Mw 2,000) was referred to as a polymer (A1-1).

[Synthesis Example 2] Synthesis of Polysilane-Polysiloxane Resin

Next, to a mixture of 190 g of cyclohexyl acetate and 1 g of 70% by mass nitric acid, methyltrimethoxysilane 17.0 g, a mixture of 5.0 g of phenyltrimethoxysilane, 45.7 g of tetramethoxysilane, and 6 g of the polymer (A1-1) was added, and the mixture was subjected to hydrolysis condensation by maintaining at 40° C. for 12 hours. After completion of the reaction, 300 g of cyclohexyl acetate was added, and by-produced alcohol and excess water were distilled off under reduced pressure to obtain 300 g of a cyclohexyl acetate solution of a polysilane-polysiloxane resin (A3-1) (Mw 5,500).

[Resin Having Polysiloxane Structure]

As a resin having a polysiloxane structure, a polysiloxane resin (A2-1) represented by the formula mentioned below was used. In the following formula, a composition ratio is a molar ratio. The mass average molecular weight (Mw) is 2,900.

[Chem. 16]

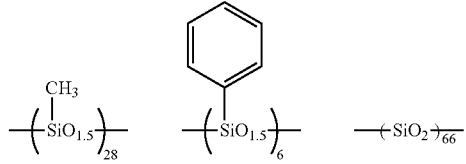

[Examples 1 to 4 and Comparative Example 1] Preparation of Resin Composition

The respective components shown in Table 1 were mixed, followed by filtration with a filter with a pore diameter of 0.1 μm made of a fluororesin to prepare a resin composition of each Example.

<In-Plane Uniformity>

Each resin composition shown in Table 1 was applied onto a wafer using a spin coater to form a coating film. The coating film was prebaked at 100° C. for 2 minutes, and then baked at 350° C. for 30 minutes using a vertical baking furnace (TS8000 MB, manufactured by TOKYO OHKA KOGYO CO. LTD.) to obtain a silicon-containing film having a thickness of about 100 nm. In-plane distribution of the thickness was measured about optional 64 points, and then evaluated in accordance with the following criteria. Good: In-plane distribution is 100 nm±5 nm or less. Bad: In-plane distribution exceeds 100 nm±5 nm. The results are shown in Table 1.

TABLE 1

| | Silicon-containing resin component | | | Solvent | | | |
|---|---|---|---|---|---|---|---|
| | Polysilane resin [Parts by mass] | Polysiloxane resin [Parts by mass] | Polysilane-polysiloxane resin [Parts by mass] | Terpene compound [Parts by mass] | Cyclic skeleton-containing acetate compound [Parts by mass] | Other solvents [Parts by mass] | Evaluation In-plane uniformity |
| Example 1 | (A1-1) [5] | (A2-1) [95] | None | None | Cyclohexyl acetate [400] | None | Good |
| Example 2 | (A1-1) [10] | None | (A3-1) [90] | None | Cyclohexyl acetate [400] | None | Good |
| Example 3 | None | None | (A3-1) | None | Cyclohexyl acetate [400] | None | Good |
| Example 4 | None | None | (A3-1) [100] | Terpineol C [1000] | None | Diethylene Glycol Diethyl ether [300] | Good |
| Comparative Example 1 | None | None | (A3-1) [100] | None | None | Propylene glycol Monoethyl ether/ Water (Mass ratio 10:1) [400] | Bad |

Terpineol C (registered trademark): manufactured by Nippon Terpene Chemicals, Inc.

As is apparent from the results shown in Table 1, the resin composition of Comparative Example 1 in which the resin is a polysilane-polysiloxane resin but the solvent is not a solvent defined in the present invention, is inferior in in-plane uniformity. Meanwhile, it is apparent that all of the resin compositions of Examples 1 to 4 in which the resin is at least one selected from the group consisting of (I) a mixture of a polysilane resin and a polysiloxane resin, and (II) a polysilane-polysiloxane resin and the solvent is a solvent defined in the present invention, are excellent in in-plane uniformity.

What is claimed is:

1. A resin composition comprising a silicon-containing resin component and a solvent, wherein:

the silicon-containing resin component comprises (I):

(I) a polysilane-polysiloxane resin having a polysilane structure (I-1) and a polysiloxane structure (I-2), the solvent comprises at least one solvent selected from the group consisting of a terpene compound having at least one group selected from the group consisting of a hydroxy group and an acetoxy group, and a cyclic skeleton-containing acetate compound (excluding the terpene compound), wherein the polysiloxane structure (I-2) comprises a hydrolyzed and condensed structure of silicon compounds selected from the group consisting of silicon compounds represented by the following general formulas (A-1-1) to (A-1-4):

$R^1R^2R^3SiX^1$ (A-1-1)

$R^4R^5SiX^2{}_2$ (A-1-2)

$R^6SiX^3{}_3$ (A-1-3)

$SiX^4{}_4$ (A-1-4)

wherein $X^1$ to $X^4$ are each independently a hydrolyzable group, and wherein $R^1$, $R^2$, $R^3$, $R^4$, $R^5$, and $R^6$ are each independently a hydrogen atom, an alkyl group having 1 to 10 carbon atoms, a cycloalkyl group having 5 to 8 carbon atoms, or an aryl group having 6 to 10 carbon atoms, and hydrogen atoms in the alkyl group having 1 to 10 carbon atoms, the cycloalkyl group having 5 to 8 carbon atoms, or the aryl group having 6 to 10 carbon atoms may be substituted with a halogen atom, wherein the polysilane structure (I-1) comprises a structure corresponding to a polysilane compound represented by the following general formula (A-2-1):

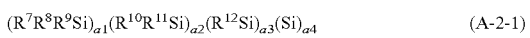

wherein $R^7$, $R^8$, $R^9$, $R^{10}$, $R^{11}$ and $R^{12}$ are each independently a hydrogen atom, a hydroxyl group, an alkyl group having 1 to 10 carbon atoms, a cycloalkyl group having 5 to 8 carbon atoms, or an aryl group having 6 to 10 carbon atoms, and a1, a2, a3 and a4 are each independently a molar fraction, a1+a2+a3+a4=1, 0≤a1<1, 0≤a2<1, 0≤a3<1 and 0≤a4<1, wherein (I) the polysilane-polysiloxane resin comprises at least one selected from the group consisting of a structure represented by the following general formulas (H1), (H2) and (H3):

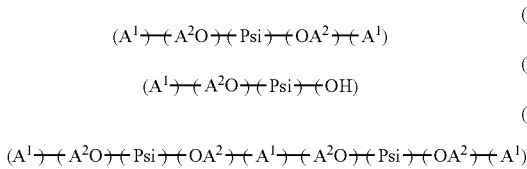

(H1)

(H2)

(H3)

wherein in the general formulas (H1) and (H2), $A^1$ each independently represents one or more polysiloxane structural units selected from the group consisting of structures represented by any one of general formulas (A1-a) to (A1-d) shown below, and also includes at least one structure represented by the general formula (A1-a), wherein in the general formulas (H3), $A^1$, $-A^2O-$, $-OA^2-$, and Psi are the same as defined in the general formula (H1), and $-A^2O-$ each independently represents one or more linking group units which is any one of the structures represented by the general formula (A2) shown below, in the general formulas (H1), $-OA^2-$ represents an $-OSi-$ structural unit in which the order of bonding a main chain $-SiO-$ in the general formula (A2) shown below is reversed, Psi represents a polysilane structural unit (I-1) comprising a polysilane structure having 3 to 40 Si atoms, in the general formulas (H1), (H2) and (H3), a bond linking each structural unit represents one or more bonds:

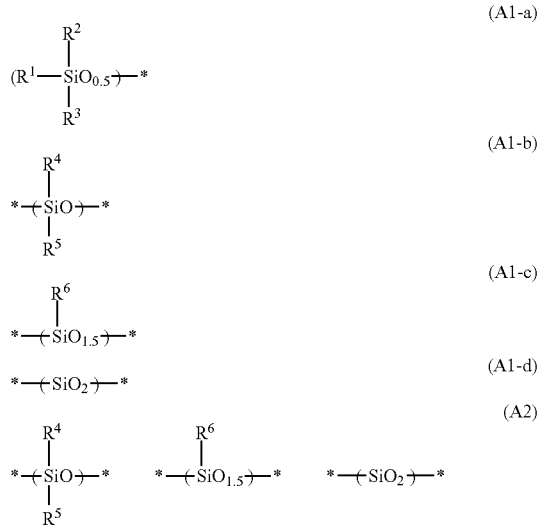

wherein in the general formulas (A1) and (A2), $R^2$, $R^3$, $R^4$, $R^5$, and $R^6$ are each independently a hydrogen atom, an alkyl group having 1 to 10 carbon atoms, a cycloalkyl group having 5 to 8 carbon atoms, or an aryl group having 6 to 10 carbon atoms, and hydrogen atoms in the alkyl group having 1 to 10 carbon atoms, the cycloalkyl group having 5 to 8 carbon atoms, or the aryl group having 6 to 10 carbon atoms may be substituted with a halogen atom.

2. The resin composition according to claim 1, wherein the cyclic skeleton-containing acetate compound is cycloalkyl acetate represented by the following formula (S1):

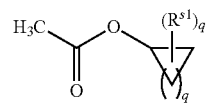

(S1)

in the formula (Si), $R^{s1}$ is an alkyl group, p is an integer of 1 to 6, and q is an integer of 0 to (p+1).

3. A method for producing the composition according to claim 1, the method comprising performing a hydrolysis and condensation reaction of at least one silicon compound selected from the group consisting of silicon compounds represented by the general formulas (A-1-1) to (A-1-4) mentioned below, and at least one selected from the group consisting of a hydrolyzate, a condensate, and a hydrolyzed condensate of the silicon compound with a resin having a polysilane structure to obtain a polysilane-polysiloxane resin:

$R^1R^2R^3SiX^1$ (A-1-1)

$R^4R^5SiX^2{}_2$ (A-1-2)

$R^6SiX^3{}_3$ (A-1-3)

$SiX^4{}_4$ (A-1-4)

wherein $X^1$ to $X^4$ are each independently a hydrolyzable group, and wherein $R^1$, $R^2$, $R^3$, $R^4$, $R^5$, and $R^6$ are each independently a hydrogen atom, an alkyl group having 1 to 10 carbon atoms, a cycloalkyl group having 5 to 8 carbon atoms, or an aryl group having 6 to 10 carbon atoms, and hydrogen atoms in the alkyl group having 1 to 10 carbon atoms, the cycloalkyl group having 5 to 8 carbon atoms, or the aryl group having 6 to 10 carbon atoms may be substituted with a halogen atom.

4. A method of forming a film using the composition according to claim 1.

5. A cured product of the composition according to claim 1.

6. The resin composition according to claim 1, wherein the polysilane structure (I-1) represented by Psi comprises a polysilane structure having 5 to 40 Si atoms.

7. The resin composition according to claim 1, consisting essentially of the silicon-containing resin component and the solvent.

8. A resin composition consisting essentially of a silicon-containing resin component and a solvent, wherein:
the silicon-containing resin component comprises (I):
(I) a polysilane-polysiloxane resin having a polysilane structure (I-1) and a polysiloxane structure (I-2),
the solvent comprises at least one solvent selected from the group consisting of a terpene compound having at least one group selected from the group consisting of a hydroxy group and an acetoxy group, and a cyclic skeleton-containing acetate compound (excluding the terpene compound),
wherein the polysiloxane structure (I-2) comprises a hydrolyzed and condensed structure of silicon compounds selected from the group consisting of silicon compounds represented by the following general formulas (A-1-1) to (A-1-4):

$R^1R^2R^3SiX^1$ (A-1-1)

$R^4R^5SiX^2{}_2$ (A-1-2)

$R^6SiX^3{}_3$ (A-1-3)

$SiX^4{}_4$ (A-1-4)

wherein $X^1$ to $X^4$ are each independently a hydrolyzable group, and wherein $R^1$, $R^2$, $R^3$, $R^4$, $R^5$, and $R^6$ are each independently a hydrogen atom, an alkyl group having 1 to 10 carbon atoms, a cycloalkyl group having 5 to 8 carbon atoms, or an aryl group having 6 to 10 carbon atoms, and hydrogen atoms in the alkyl group having 1 to 10 carbon atoms, the cycloalkyl group having 5 to 8 carbon atoms, or the aryl group having 6 to 10 carbon atoms may be substituted with a halogen atom, wherein the polysilane structure (I-1) comprises a structure corresponding to a polysilane compound represented by the following general formula (A-2-1):

$$(R^7R^8R^9Si)_{a1}(R^{10}R^{11}Si)_{a2}(R^{12}Si)_{a3}(Si)_{a4} \quad \text{(A-2-1)}$$

wherein $R^7$, $R^8$, $R^9$, $R^{10}$, $R^{11}$ and $R^{12}$ are each independently a hydrogen atom, a hydroxyl group, an alkyl group having 1 to 10 carbon atoms, a cycloalkyl group having 5 to 8 carbon atoms, or an aryl group having 6 to 10 carbon atoms, and a1, a2, a3 and a4 are each independently a molar fraction, a1+a2+a3+a4=1, 0≤a1<1, 0≤a2<1, 0≤a3<1 and 0≤a4<1, wherein (I) the polysilane-polysiloxane resin comprises at least one selected from the group consisting of a structure represented by the following general formulas (H1), (H2) and (H3):

$$(A^1)\!\!-\!\!(A^2O)\!\!-\!\!(Psi)\!\!-\!\!(OA^2)\!\!-\!\!(A^1) \quad \text{(H1)}$$

$$(A^1)\!\!-\!\!(A^2O)\!\!-\!\!(Psi)\!\!-\!\!(OH) \quad \text{(H2)}$$

$$(A^1)\!\!-\!\!(A^2O)\!\!-\!\!(Psi)\!\!-\!\!(OA^2)\!\!-\!\!(A^1)\!\!-\!\!(A^2O)\!\!-\!\!(Psi)\!\!-\!\!(OA^2)\!\!-\!\!(A^1) \quad \text{(H3)}$$

wherein in the general formulas (H1) and (H2), $A^1$ each independently represents one or more polysiloxane structural units selected from the group consisting of structures represented by any one of general formulas (A1-a) to (A1-d) shown below, and also includes at least one structure represented by the general formula (A1-a), wherein in the general formulas (H3), $A^1$, -$A^2O$—, —$OA^2$-, and Psi are the same as defined in the general formula (H1), and -$A^2O$— each independently represents one or more linking group units which is any one of the structures represented by the general formula (A2) shown below, in the general formulas (H1), —$OA^2$- represents an —OSi— structural unit in which the order of bonding a main chain —SiO— in the general formula (A2) shown below is reversed, Psi represents a polysilane structural unit (I-1) comprising a polysilane structure having 3 to 40 Si atoms, in the general formulas (H1), (H2) and (H3), a bond linking each structural unit represents one or more bonds:

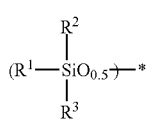
(A1-a)

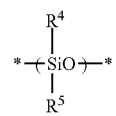
(A1-b)

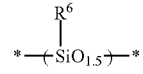
(A1-c)

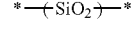
(A1-d)

(A2)

wherein in the general formulas (A1) and (A2), $R^1$, $R^2$, $R^3$, $R^4$, $R^5$, and $R^6$ are each independently a hydrogen atom, an alkyl group having 1 to 10 carbon atoms, a cycloalkyl group having 5 to 8 carbon atoms, or an aryl group having 6 to 10 carbon atoms, and hydrogen atoms in the alkyl group having 1 to 10 carbon atoms, the cycloalkyl group having 5 to 8 carbon atoms, or the aryl group having 6 to 10 carbon atoms may be substituted with a halogen atom.

9. A resin composition comprising a silicon-containing resin component and a solvent, wherein:

the silicon-containing resin component comprises (I):

(I) a polysilane-polysiloxane resin having a polysilane structure (I-1) and a polysiloxane structure (I-2), the solvent consists essentially of a terpene compound having at least one group selected from the group consisting of a hydroxy group and an acetoxy group, wherein the polysiloxane structure (I-2) comprises a hydrolyzed and condensed structure of silicon compounds selected from the group consisting of silicon compounds represented by the following general formulas (A-1-1) to (A-1-4):

$$R^1R^2R^3SiX^1 \quad \text{(A-1-1)}$$

$$R^4R^5SiX^2_2 \quad \text{(A-1-2)}$$

$$R^6SiX^3_3 \quad \text{(A-1-3)}$$

$$SiX^4_4 \quad \text{(A-1-4)}$$

wherein $X^1$ to $X^4$ are each independently a hydrolyzable group, and wherein $R^1$, $R^2$, $R^3$, $R^4$, $R^5$, and $R^6$ are each independently a hydrogen atom, an alkyl group having 1 to 10 carbon atoms, a cycloalkyl group having 5 to 8 carbon atoms, or an aryl group having 6 to 10 carbon atoms, and hydrogen atoms in the alkyl group having 1 to 10 carbon atoms, the cycloalkyl group having 5 to 8 carbon atoms, or the aryl group having 6 to 10 carbon atoms may be substituted with a halogen atom, wherein the polysilane structure (I-1) comprises a structure corresponding to a polysilane compound represented by the following general formula (A-2-1):

$$(R^7R^8R^9Si)_{a1}(R^{10}R^{11}Si)_{a2}(R^{12}Si)_{a3}(Si)_{a4} \quad \text{(A-2-1)}$$

wherein $R^7$, $R^8$, $R^9$, $R^{10}$, $R^{11}$ and $R^{12}$ are each independently a hydrogen atom, a hydroxyl group, an alkyl group having 1 to 10 carbon atoms, a cycloalkyl group having 5 to 8 carbon atoms, or an aryl group having 6 to 10 carbon atoms, and a1, a2, a3 and a4 are each independently a molar fraction, a1+a2+a3+a4=1, 0≤a1<1, 0≤a2<1, 0≤a3<1 and 0≤a4<1, wherein (I) the polysilane-polysiloxane resin comprises at least one selected from the group consisting of a structure represented by the following general formulas (H1), (H2) and (H3):

$$(A^1)\!\!-\!\!(A^2O)\!\!-\!\!(Psi)\!\!-\!\!(OA^2)\!\!-\!\!(A^1) \tag{H1}$$

$$(A^1)\!\!-\!\!(A^2O)\!\!-\!\!(Psi)\!\!-\!\!(OH) \tag{H2}$$

$$(A^1)\!\!-\!\!(A^2O)\!\!-\!\!(Psi)\!\!-\!\!(OA^2)\!\!-\!\!(A^1)\!\!-\!\!(A^2O)\!\!-\!\!(Psi)\!\!-\!\!(OA^2)\!\!-\!\!(A^1) \tag{H3}$$

wherein in the general formulas (H1) and (H2), $A^1$ each independently represents one or more polysiloxane structural units selected from the group consisting of structures represented by any one of the general formulas (A1-a) to (A1-d) shown below, and also includes at least one structure represented by the general formula (A1-a), in the general formula (H3), $A^1$, $-A^2O-$, $-OA^2-$, and Psi are the same as defined in the general formula (H1), and $-A^2O-$ each independently represents one or more linking group units which is any one of structures represented by the general formula (A2) shown below, in the general formulas (H1), $-OA^2-$ represents an $-OSi-$ structural unit in which the order of bonding a main chain $-SiO-$ in the general formula (A2) shown below is reversed, Psi represents a polysilane structural unit (I-1), in the general formulas (H1), (H2) and (H3), a bond linking each structural unit represents one or more bonds:

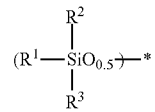
(A1-a)

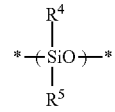
(A1-b)

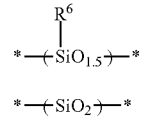
(A1-c)

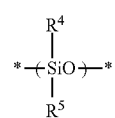
(A1-d)

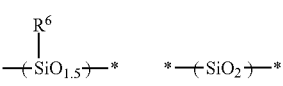
(A2)

wherein in the general formulas (A1) and (A2), $R^1$, $R^2$, $R^3$, $R^4$, $R^5$, and $R^6$ are each independently a hydrogen atom, an alkyl group having 1 to 10 carbon atoms, a cycloalkyl group having 5 to 8 carbon atoms, or an aryl group having 6 to 10 carbon atoms, and hydrogen atoms in the alkyl group having 1 to 10 carbon atoms, the cycloalkyl group having 5 to 8 carbon atoms, or the aryl group having 6 to 10 carbon atoms may be substituted with a halogen atom.

* * * * *